United States Patent [19]

Tateishi et al.

[11] Patent Number: 4,514,847
[45] Date of Patent: Apr. 30, 1985

[54] KEY STORAGE ERROR PROCESSING SYSTEM

[75] Inventors: Terutaka Tateishi, Kawasaki; Kazuyuki Shimizu, Machida, both of Japan

[73] Assignee: Fujitsu Limited, Kawasaki, Japan

[21] Appl. No.: 419,927

[22] Filed: Sep. 20, 1982

[30] Foreign Application Priority Data

Sep. 24, 1981 [JP] Japan .............................. 56-151046

[51] Int. Cl.$^3$ .............................................. G06F 11/10
[52] U.S. Cl. ........................................ 371/51; 371/49
[58] Field of Search ............................ 371/21, 49, 51; 364/200 MS File, 900 MS File

[56] References Cited

U.S. PATENT DOCUMENTS

| 4,020,459 | 4/1977 | Coomer .................................. 371/51 |
| 4,053,752 | 10/1977 | DeJohn et al. .................... 371/21 X |
| 4,084,236 | 4/1978 | Chelberg et al. .................... 364/200 |
| 4,092,713 | 5/1978 | Scheuneman ........................ 364/200 |
| 4,103,823 | 8/1978 | Aichelmann, Jr. et al. ..... 371/51 X |
| 4,146,099 | 3/1979 | Matsushima et al. ................ 371/51 |

FOREIGN PATENT DOCUMENTS 0010123 7/1979 European Pat. Off. .

OTHER PUBLICATIONS

"Storage Protect Mechanism with Reference and Change Recording", *IBM Technical Disclosure Bulletin*, vol. 14, No. 12, May 1972, pp. 3584-3585.
"Cache Error Handling in a Store-in-Cache Design", *IBM Technical Disclosure Bulletin*, vol. 20, No. 9, Feb. 1978.
"Memory Management", *Computer Design*, vol. 20, No. 7, Jul. 1981, pp. 151-156.

Primary Examiner—Jerry Smith
Assistant Examiner—Mark Ungerman
Attorney, Agent, or Firm—Staas & Halsey

[57] ABSTRACT

In a system which is provided with a key storage having stored therein main storage keys respectively corresponding to pages into which a main storage is split, each main storage key having at least a reference bit indicating whether the corresponding page is being accessed and a change bit indicating whether information has been written in the page, and in which a parity bit is added to each of the reference bits and the change bits to form the main storage key. There are provided a detecting device for detecting a parity error in a pair of the reference bit and the parity bit and a pair of the change bit and the parity bit when the main storage key is read out, and a device for rewriting the main storage key after setting the reference bit to a "1" indicating the corresponding page is being accessed and adding a new parity bit "0" to the reference bit when a parity error is detected by the detecting device in the pair of the reference bit and the parity bit and after setting the change bit to a "1" indicating a write in the corresponding page and adding an new parity bit "0" to the change bit when a parity error is detected in the pair of the change bit and the parity bit, thereby controlling the saving of the pages of the main storage into external storage.

4 Claims, 5 Drawing Figures

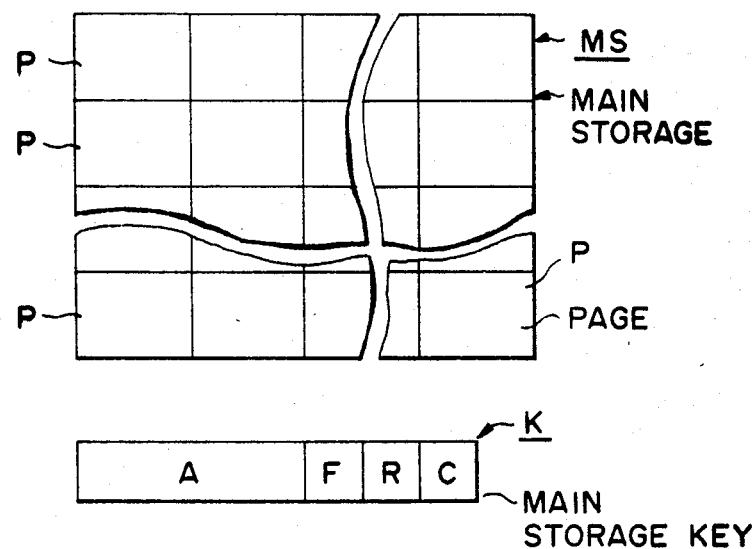

FIG. 3
PRIOR ART

|     | (a) | (b) | (c) |
|-----|-----|-----|-----|
|     | t1 → | t2 → | t3 |
| (1) | 0 1 | *<br>1 1 | * *<br>1 0 |
| (2) | ⇓<br>0 | ⇓<br>1 | ⇓<br>1 |
| (3) | 0 1 | *<br>0 0 | * *<br>1 0 |
| (4) | ⇓<br>0 | ⇓<br>1 | ⇓<br>1 |
| (5) | 1 0 | *<br>0 0 | * *<br>0 1 |
| (6) | ⇓<br>1 | ⇓<br>1 | ⇓<br>0 |
| (7) | 1 0 | *<br>1 1 | * *<br>0 1 |
| (8) | ⇓<br>1 | ⇓<br>1 | ⇓<br>0 |

FIG. 4

| | (a) | (b) | (c) | (d) |
|---|---|---|---|---|
| | t1 | t2 | t3 | t4 |
| (1) | 0 1 | *1 1 | 1 0 | *1 1 |
| (2) | ⇓ 0 | ⇓ 1 | | ⇓ 1 |
| (3) | 0 1 | *0 0 | 1 0 | *0 0 |
| (4) | ⇓ 0 | ⇓ 1 | | ⇓ 1 |
| (5) | 1 0 | *0 0 | 1 0 | *1 1 |
| (6) | ⇓ 1 | ⇓ 1 | | ⇓ 1 |
| (7) | 1 0 | *1 1 | 1 0 | *0 0 |
| (8) | ⇓ 1 | ⇓ 1 | | ⇓ 1 |

KEY STORAGE ERROR PROCESSING SYSTEM

BACKGROUND OF THE INVENTION

1. Field of the Invention

The present invention relates to a key storage error processing system which remedies errors in reference and update bits of a key storage.

2. Description of the Prior Art

FIG. 1 illustrates the relationship between a main storage and a key storage. Reference character MS indicates generally a main storage; P designates pages; K identifies a main storage key; A denotes an access-control bit; F represents a fetch-protection bit; R shows a reference bit; and C refers to a change bit. The main storage MS is split into a plurality of pages P, each consisting of a 2K-byte block, for instance, and each associated with one main storage key K. The main storage key K is stored in a key storage (not shown). An information processing system equipped with such a main storage and a key storage as mentioned above is disclosed, for example, in IBM System/370 Principles of Operation.

Whenever information is stored or fetched, the access-control bit A of the main storage key K is matched with a program-protection key, thereby performing storage protection of the main storage MS. The fetch-protection bit F indicates whether the storage protection is applied when information is fetched from the main storage MS. The reference bit R indicates whether the corresponding page of the main storage is being accessed, and when the page is accessed, the reference bit R of the main storage key K corresponding to the page is set to a "1". The change bit C indicates whether changed information is stored in the corresponding page of the main storage MS, and when changed information is stored in the page, the change bit C of the corresponding main storage key K is set to a "1".

The reference bit R and the change bit C are used when information is transferred in units of pages, to the main storage MS from an external storage, such as a magnetic disc unit. For instance, in a computer system of a virtual storage system type, information is fetched and stored on the assumption that the storage area of an external storage exists in the main storage. Accordingly, when information being required is not in the main storage MS, the information is paged-in from the external storage to the main storage MS and an area must be secured therefor in the main storage MS. In this case, if there is no space in the main storage MS, a search is made for an area or page that is considered unnecessary and its information is paged-out into the external storage to free the area for receiving the information from the external storage.

In such a page-out operation, priorities are usually attached to the pages for making the search for an unnecessary area. FIG. 2 shows the relationship between the priority and the reference and change bits R and C. When the change bit C is "0", it indicates that the contents of the page of the main storage MS corresponding to the main storage key K remain unchanged and, accordingly, the same contents are stored in the external storage and the contents of the page need not be transferred thereto. That is, the page-out operation is unnecessary. The reference bit R indicates whether the page of the main storage MS corresponding to the main storage key K is being accessed or not. Accordingly, when the reference bit R and the change bit C are both "0", the contents of the corresponding page are not changed, nor is it being accessed, so that the page is given the highest priority for a save. When the reference bit R and the change bit C are both "1", the contents of the page are changed and it is being accessed and, accordingly, the page is given the fourth priority for a save. Incidentally, the reference bit R is set to "0" by the execution of a reset reference bit instruction when the key storage is retrieved for a fixed period of time or for the page-out operation.

It is general practice to add a parity bit for detection of an error in the reference bit R and the change bit C. FIG. 3 is explanatory of a conventional error processing system employing odd parity. In FIG. 3, (a) shows the case where two bits of a pair of the reference bit R or the change bit C and a parity bit are correct at a time t1; (b) shows the case where when the reference bit R or the change bit C is read out at a time t2 after the lapse of an arbitrary period of time, one of the two bits is erroneous; and (c) shows the case where the reference bit R or the change bit C is read out at a time t3 a certain period of time after the time t2 and the other bit is also erroneous. An asterisk indicates the erroneous bit. (1), (3), (5) and (7) show the pair of the reference bit R or the change bit C and the parity bit, and (2), (4) (6) and (8) show bits that are transferred to an access control unit of the main storage MS for the decision of the page-out and so on.

For instance, when the main storage key K is read out at the time t1 as shown in (a)-(1) or (a)-(3), "01" which is a pair of "0" of the reference bit R or the change bit C and "1" of the parity bit is correct and, consequently, a "0" shown in (a)-(2) or (a)-(4) is transferred to the access control unit of the main storage MS. When the readout takes place again at the subsequent time t2, if a one-bit error occurs resulting in "11" as shown in (b)-(1), the error is detected by a parity check and a "1" shown in (b)-(2) is transferred to the access control unit. That is, when an error is detected by the parity check, a "1" indicating an access or a change is transferred to the access control unit. Further, when the other bit also becomes erroneous at the time t3 to provide "10" as shown in (c)-(1), it is decided as error-free by the parity check and a "1" shown in (c)-(2) is transferred to the access control unit. Also in the case where the main storage key K is read out at the time t2 and a one-bit error occurs to provide "00", a "1" shown in (b)-(4) is transferred to the access control unit. Moreover, when the other bit becomes erroneous to provide "10" as shown in (c)-(3), it is decided as error-free by the parity check and a "1" shown in (c)-(4) is transferred to the access control unit.

When the reference bit R is changed from a "0" to a "1", the priority for the saving of the page corresponding to the main storage key is lowered and even if its priority is the first or second highest one, it is given the third or fourth highest priority. This merely reduces the number of pages of high priority which are to be saved, but does not impair the system performance. When the change bit C is changed from a "0" to a "1", the priority for the saving of the page in lowered as is the case with the reference bit. When the page corresponding to the main storage key is designated to be saved, the page-out operation takes place. This means that the page-out operation, which is omissible if the change bit C is a "0", is carried out, thus, resulting in a somewhat lowered system performance, but this does not matter so seriously.

In the case where the correct content of the bit pair is "10" as shown in (a)-(5), if the reference bit R or the change bit C becomes erroneous as shown in (b)-(5), a "1" shown in (b)-(6) is transferred to the access control unit as the result of a parity check. However, if the content becomes "01" owing to an error of the other bit at the time of reading out the main storage key K at the time t3 as shown in (c)-(5), the content is decided as error-free by the parity check and a "0" shown in (c)-(6) is transferred to the access control unit. The same is true of the case where the content "10" of the bit pair at the time t1 changes to "11" at the time t2 and then changes to "01" at the time t3 as shown in (7). In this way, a change in the reference bit R or the change bit C raises save priority, and this introduces the possibility of saving a page which ought not to be saved. As a consequence, there are some occasions when the page which may well be in use is paged-out and then paged-in, resulting in appreciably impaired system performance. Moreover, when the change bit C changes from a "1" to a "0" due to an error, data rewritten in the main storage is destroyed by the omission of the page-out operation which saves the changed data. Accordingly, the system breaks down under the worst case.

SUMMARY OF THE INVENTION

It is therefore an object of the present invention to provide a key storage error processing system which performs correction processing at the time of detecting an error so to prevent a system breakdown even by an error in key storage.

Another object of the present invention is to provide a key storage error processing system which performs correction processing, with a simple arrangement, for preventing lowering of system performance and a system breakdown by the detection of an error in a reference bit or change bit of a main storage key.

Briefly stated, according to the present invention, in a system which has main storage keys respectively corresponding to pages of a main storage, a parity bit is added to each of reference and change bits; when the main storage key is read out, a parity check takes place; if a parity error is detected, the reference bit is set to a content indicating an access in progress and the change bit is set to a content indicating a change and, further, a parity bit is added; and then the main storage key is rewritten.

BREIF DESCRIPTION OF THE DRAWINGS

FIG. 1 illustrates a main storage and a main storage key;
FIG. 2 illustrates the priority for a save;
FIG. 3 is a diagram explaining a conventional error processing system;
FIG. 4 is a diagram explaining an error processing embodying the present invention; and
FIG. 5 is a block diagram illustrating an embodiment of the present invention.

DESCRIPTION OF THE PREFERRED EMBODIMENTS

Figure 5:
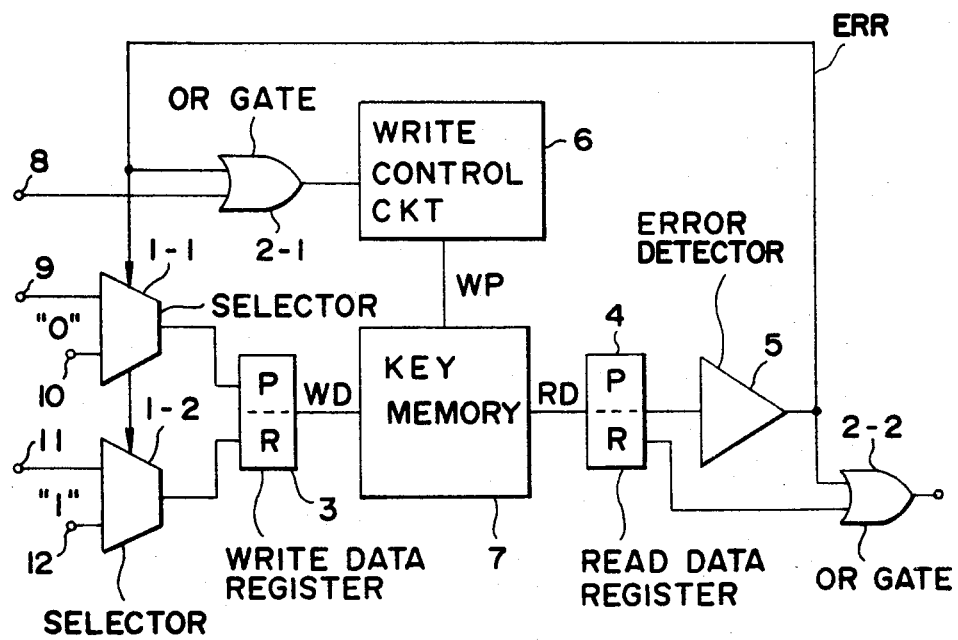

In FIG. 4, (a) shows the case where two bits consisting of the reference bit R or the change bit C and a parity bit are correct at the time t1; (b) shows the case where when the reference bit R or the change bit C is read out at the time t2 an error occurs in one of the two bits; (c) shows the case where a rewrite is carried out at the time t3 because of a parity error; and (d) shows the case where an error occurs in the other bit when the reference bit R or the change bit C is read out at a time t4 an arbitrary period of time after the time t3. An asterisk indicates the bit in which an error has occurred. (1), (3), (5) and (7) show pairs of the reference bit R or the change bit C and the parity bit, and (2), (4), (6) and (8) show bits that are transferred to the access control unit of the main storage MS for the decision concerning page-out and so on.

According to the present invention, in the case where the pair of the reference bit R or the change bit C and the parity bit are correct, the main storage key is read out at the time t2 and, if a parity error is detected, a "1" is transferred to the access control unit and, at the immediately subsequent time t3, the reference bit R is set to a "1" indicating an access in progress for the corresponding page and the change bit C is set to a "1" indicating a change in the page and, further, a "0" for the parity bit is substituted, which is followed by rewriting of the main storage key. This state is shown in (c) corresponding to the time t3. That is to say, when an error is detected by the parity check in the pair of the reference bit R or the change bit C and the parity bit, a "1" is transferred to the access control unit and the reference bit R or the change bit C is set to a "1" and, at the same time, the parity bit is set to a "0" to provide a state in which the priority for the saving of the corresponding page is lowered, and then the main storage key is rewritten. Accordingly, even if an error occurs in a bit difference form an erroneous one at the time t2 when the main storage key is read out at the time t4, a "1" is transferred to the access control unit of the main storage, lowering the priority for the save. Furthermore, when the change bit C changes from a "1" (indicating changed) to a "0" (indicating not changed) due to an error, the page-out operation is not omitted even if the corresponding page is to be saved; therefore, the present invention exhibits an advantage over the prior art in that changed information in the main storage is not destroyed.

For example, in the case where a pair of a "1" of the reference bit R or the change bit C and a "0" of the parity bit is "10" at the time t1 as shown in (a)-(5), if it becomes "00" as shown in (b)-(5) when the main storage key is read out at the time t2, a "1" is transferred to the access control unit as shown in (b)-(6) and, at the time t3 immediately thereafter, the reference bit R or the change bit C is set to a "1" and the parity bit is set to a "0", and "10" is written as shown in (c)-(5). Assuming that the bit pair becomes "11" due to an error in one bit as shown in (d)-(5) when the main storage key is read out again at the time t4, the error is detected by a parity check and a "1" is transferred to the access control unit. Also in this case, "10" is written in the main storage key. Accordingly, even if the reference bit R or the change bit C changes from a "1" to a "0" owing to a bit error, and even if the parity bit changes from a "0" to a "1" the reference bit R or the change bit C is corrected to a "1" before rewriting. As a result, the priority for saving is not raised and the page-out operation is not omitted, ensuring the prevention of a system breakdown even if the page corresponding to the main storage key has to be saved.

FIG. 5 illustrates in block form the principal part of an embodiment of the present invention. Reference numerals 1-1 and 1-2 indicate selectors; 2-1 and 2-2 designate OR gates; 3 identifies a write data register; 4 denotes a read data register; 5 represents an error detector; 6 shows a write control circuit; 7 refers to a key memory; 8 signifies a write signal input terminal; 9 indicates a parity bit input terminal; 10 designates an input terminal to which a "0" is fixedly applied; 11 identifies a reference bit input terminal; 12 an input terminal to which a "1" is fixedly applied; RD denotes read data; WD represents write data; ERR shows an error detection signal; WP refers to write pulses; R signifies a reference bit; and P indicates a parity bit. In FIG. 5 there are shown only the components associated with the reference bit of the main storage key, and the change bit, other bits, the main storage, its access control units and so forth are not shown for the sake of brevity.

When the main storage key corresponding to one of the pages of the main storage is read out from the key memory 7, the read data RD is set in the read data register 4 and subjected to a parity check by the error detector 5 comprising for example, an exclusive NOR circuit or the like. When the read data is decided as error-free by the parity check, the error detection signal ERR goes to a "0". When the error detection signal ERR is "0", the selectors 1-1 and 1-2 select the parity bit and the reference bit from the input terminals 9 and 11. The reference bit is one that is input corresponding to the page of the main storage when the main storage is accessed, as described previously. From contents of the read data register 4, the reference bit R is provided via the OR gate 2-2 to the access control unit not shown.

When an error is detected in the error detector 5, the error detection signal ERR goes to a "1". This "1" is transferred via the OR gate 2-2 to the access control unit. That is, when an error is detected, even if the reference bit R is a "0", the "1" is provided to the access control unit on the assumption that the reference bit R is a "1". When the error detection signal ERR is "1", the selectors 1-1 and 1-2 select the "0" and the "1" which are fixedly applied to the input terminals 10 and 12, respectively, and apply the "0" and "1" to the write data register 3. The write control circuit 6 is started by a "1" which is applied thereto via the OR gate 2-1, and outputs the write pulses WP. Based on the write pulses WP the contents of the write data register 3 are written into the key memory 7. In this case, since the contents of the write data register 3 are written in the same address as the address of the main storage key read out, the reference bit R and the parity bit P of the main storage key are written as "10". In other words, the reference bit R and the parity bit P are rewritten due to the error detection into "10" as shown in (c) in FIG. 4.

Furthermore, the pair of the change bit C and the parity bit is also rewritten by the error detection through an arrangement similar to the above-described one.

As has been described in the foregoing, according to the present invention, when the pairs of the reference bit R and the change bit C and the parity bit are read out, if a parity error is detected, the main storage key is rewritten, with the reference bit indicating that the page corresponding to the main storage key is being accessed and the change bit indicating that the page has been changed. Accordingly, the priority for the save in the page of the main storage is not raised and a page presently required is not saved. Even if the page is saved, necessary data is not destroyed because the page-out operation is carried out without fail. Therefore, system breakdown can be avoided.

It will be apparent that many modifications and variations may be effected without departing from the scope of the novel concepts of the present invention.

What is claimed is:

1. A key storage error processing system for a system which is provided with a key storage having stored therein main storage keys respectively corresponding to pages into which a main storage is split, each main storage key having at least a reference bit indicating whether the corresponding page is being accessed and a change bit indicating whether information has been written into the page, and in which a parity bit is added to each of the reference bit and the change bit to form the main storage key, said system comprising:
    detecting means, operatively connected to the key storage, for detecting a parity error in a pair of the reference bit and the parity bit and a pair of the change bit and the parity bit when the main storage key is read out; and
    means, operatively connected to the key storage and said detecting means, for rewriting the main storage key after setting the reference bit to a state indicating access to the corresponding page and adding a new parity bit to the reference bit when a parity error is detected by the detecting means in the pair of the reference bit and the parity bit and after setting the change bit to a state indicating the write in the corresponding page and adding a new parity bit to the change bit when a parity error is detected in the pair of the change bit and the parity bit.

2. A key storage error processing system according to claim 1,
    wherein said detecting means generates an error detection signal when a parity error is detected, and
    wherein said means for rewriting comprises:
        a write control circuit, operatively connected to said detecting means and the key storage, which is started by the error detection signal when the parity error is detected by the detecting means; and
        a selector, operatively connected to said detecting means, for applying to the key storage the reference bit or the change bit and the new parity bit after setting the former to "1" and the latter to "0" in dependence upon the error detection signal.

3. A key storage error processing system according to claim 2, wherein said means for rewriting further comprises:
    a first OR gate having an input operatively connected to said detecting means and an output operatively connected to said write control circuit;
    a write data register operatively connected to said selector and the key storage;
    a read data register operatively connected to the key storage and said detecting means; and
    a second OR gate having a first input operatively connected to said detecting means and a second input operatively connected to said read data register.

4. A key storage error processing system according to claim 3, wherein said detecting means comprises an exclusive NOR gate having an input operatively connected to said read data register, and an output operatively connected to said first and second OR gates and said selector.

* * * * *

UNITED STATES PATENT AND TRADEMARK OFFICE
CERTIFICATE OF CORRECTION

PATENT NO. : 4,514,847                                    Page 1 of 2
DATED     : April 30, 1985
INVENTOR(S) : TERUTAKA TATEISHI ET AL.

It is certified that error appears in the above-identified patent and that said Letters Patent is hereby corrected as shown below:   On the title page;

[56] Foreign Patent Documents

"1979" should be --1980--.

Col. 2, line 26, "(4)" should be --(4),--;

line 63, "in" should be --is--;

"is" should be --in--.

Col. 3, line  7, "a" should be --the--;

line 17, before "save" insert --the--;

line 32, delete "so".

line 51, "BREIF" should be --BRIEF--.

Col. 4, line 32, "difference form" should be --difference from--.

UNITED STATES PATENT AND TRADEMARK OFFICE
CERTIFICATE OF CORRECTION

PATENT NO. : 4,514,847

DATED : April 30, 1985

INVENTOR(S) : TERUTAKA TATEISHI ET AL.

It is certified that error appears in the above-identified patent and that said Letters Patent is hereby corrected as shown below:

Col. 5, line 20, after "comprising" insert --,--;

line 60, delete ",";

line 63, "in" should be --of--;

line 64, "of" should be --in--.

Signed and Sealed this

First Day of October 1985

[SEAL]

Attest:

Attesting Officer

DONALD J. QUIGG

Commissioner of Patents and Trademarks—Designate